United States Patent Office 2,864,799
Patented Dec. 16, 1958

2,864,799

ALIPHATIC POLYEPOXIDE TREATED AMINE-MODIFIED PHENOL-ALDEHYDE RESINS, AND METHOD OF MAKING SAME

Melvin De Groote, St. Louis, and Kwan-Ting Shen, Brentwood, Mo., assignors to Petrolite Corporation, Wilmington, Del., a corporation of Delaware No Drawing. Original application March 13, 1953, Serial No. 342,285. Divided and this application June 15, 1956, Serial No. 591,550

10 Claims. (Cl. 260—45.1)

This application is a division of our co-pending application Serial No. 342,285, filed March 13, 1953.

Our invention is concerned with new chemical products or compounds useful as demulsifying agents in processes or procedures particularly adapted for preventing, breaking or resolving emulsions of the water-in-oil type and particularly petroleum emulsions. Our invention is also concerned with the application of such chemical products or compounds in various other arts and industries as well as with methods of manufacturing the new chemical products or compounds which are of outstanding value in demulsification.

Our co-pending application, Serial No. 338,577, filed Feb. 24, 1953, now U. S. Patent 2,771,439, is concerned with certain new products, compounds, or compositions which are useful in various arts and particularly for the resolution of petroleum emulsions of the water-in-oil type. The products described in said co-pending application are obtained by first condensing certain phenol-aldehyde resins, therein described in detail, with certain cyclic amidines, therein described in detail, and formaldehyde, which condensation is followed by the reaction of the resin condensate with certain phenolic polyepoxides, also therein described in detail, and cogenerically associated compounds formed in the preparation of the polyepoxides.

In the present instance the invention is concerned with the products which in essence are the counterpart of those described in our aforementioned co-pending application, Serial No. 338,577, filed February 24, 1953, except that the polyepoxide used, and particularly the diepoxide, is nonaryl and hydrophile in character rather than hydrophobe.

Thus the present invention is concerned with the method of first condensing certain phenol-aldehyde resins, hereinafter described in detail, with certain cyclic amidines, hereinafter described in detail, and formaldehyde, which condensation is followed by the reaction of the resin condensate with certain nonaryl hydrophile polyepoxides, also hereinafter described in detail.

The present invention is characterized by the use of compounds derived from diglycidyl ethers which do not introduce any hydrophobe properties in its usual meaning but in fact are more apt to introduce hydrophile properties. Thus, the diepoxides employed in the present invention are characterized by the fact that the divalent radical connecting the terminal epoxide radicals contain less than 5 carbon atoms in an uninterrupted chain.

The diepoxides employed in the present process are obtained from glycols such as ethylene glycol, diethylene glycol, propylene glycol, dipropylene glycol, tripropylene glycol, glycerol, diglycerol, triglycerol, and similar compounds. Such products are well known and are characterized by the fact that there are not more than 4 uninterrupted carbon atoms in any group which is part of the radical joining the epoxide groups. Of necessity such diepoxides must be nonaryl or aliphatic in character. The diglycidyl ethers of copending application, Serial No. 338,577, are invariably and inevitably aryl in character.

The diepoxides employed in the present process are usually obtained by reacting a glycol or equivalent compound, such as glycerol or diglycerol, with epichlorohydrin and subsequently with an alkali. Such diepoxides have been described in the literature and particularly the patent literature. See, for example, Italian Patent No. 400,973, dated August 8, 1951; see, also, British Patent 518,057, dated December 10, 1938; and U. S. Patent No. 2,070,990, dated February 16, 1937, to Gross et al. Reference is made also to U. S. Patent No 2,581,464, dated January 8, 1952, to Zech. This particular last mentioned patent describes a composition of the following general formula:

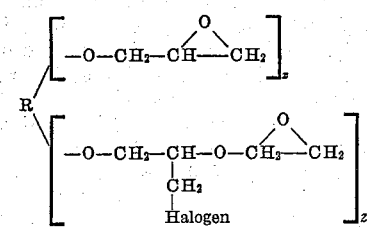

in which $x$ is at least 1, $z$ varies from less than 1 to more than 1, and $x$ and $z$ together are at least 2 and not more than 6, and R is the residue of the polyhydric alcohol remaining after replacement of at least 2 of the hydroxyl groups thereof with the epoxide ether groups of the above formula, and any remaining groups of the residue being free hydroxyl groups.

It is obvious from what is said in the patent that variance can be obtained in which the halogen is replaced by a hydroxyl radical; thus the formula would become

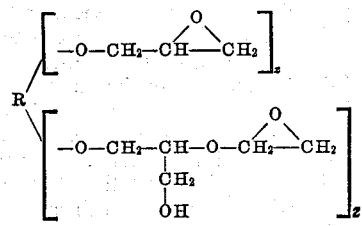

Reference to being thermoplastic characterizes them as being liquids at ordinary temperature or readily convertible to liquids by merely heating below the point of pyrolysis and thus differentiates them from infusible resins. Reference to being soluble in an organic solvent means any of the usual organic solvents such as alcohols, ketones, esters, ethers, mixed solvents, etc. Reference to solubility is merely to differentiate from a reactant which is not soluble and might be not only insoluble but also infusible. Furthermore, solubility is a factor insofar that it sometimes is desirable to dilute the compound containing the epoxy rings before reacting with an amine condensate. In such instances, of course, the solvent selected would have to be one which is not susceptible to oxyalkylation, as, for example, kerosene, benzene, toluene, dioxane, possibly various ketones, chlorinated solvents, dibutyl ether, dihexyl ether, ethyleneglycol diethylether, diethyleneglycol diethylether, and dimethoxytetraethyleneglycol.

The expression "epoxy" is not usually limited to the 1,2-epoxy ring. The 1,2-epoxy ring is sometimes referred to as the oxirane ring to distinguish it from other epoxy rings. Hereinafter the word "epoxy" unless indicated otherwise, will be used to mean the oxirane ring, i. e., the 1,2-epoxy ring. Furthermore, where a compound has two or more oxirane rings they will be referred to as polyepoxides. They usually represent, of course, 1,2-epoxide rings or oxirane rings in the alpha-omega position. This is a departure, of course, from the standpoint of strictly formal nomenclature as in the example of the simplest diepoxide which contains at least 4 carbon atoms and is formally described as 1,2-epoxy-3,4-epoxybutane-(1,2-3,4 diepoxybutane).

It well may be that even though the previously suggested formula represents the principal component, or components, of the resultant or reaction product described in the previous text, it may be important to note that somewhat similar compounds, generally of much higher molecular weight, have been described as complex resinous epoxides which are polyether derivatives of polyhydric compounds containing an average of more than one epoxide group per molecule and free from functional groups other than epoxide and hydroxyl groups. The compounds here included are limited to the monomers or the low molal members of such series and generally contain two epoxide rings per molecule and may be entirely free from a hydroxyl group. This is important because the instant invention is directed towards products which are not insoluble resins and have certain solubility characteristics not inherent in the usual thermosetting resins. Simply for purpose of illustration to show a typical diglycidyl ether of the kind herein employed, reference is made to the following formula:

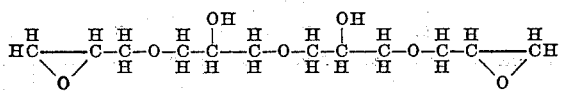

or if derived from cyclic diglycerol the structure would be thus:

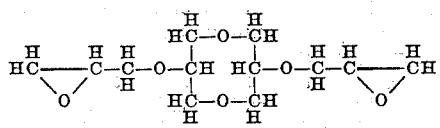

Commercially available compounds seem to be largely the former with comparatively small amounts, in fact comparatively minor amounts, of the latter.

Having obtained a reactant having generally 2 epoxy rings as depicted in the next to last formula preceding, or low molal polymers thereof, it becomes obvious the reaction can take place with any amine-modified phenol-aldehyde resin by virtue of the fact that there are always present reactive hydroxyl groups which are part of the phenolic nuclei and there may be present reactive hydrogen atoms attached to a nitrogen atom, or an oxygen atom, depending on the presence of a hydroxylated group or secondary amino group.

To illustrate the products which represent the subject matter of the present invention reference will be made to a reaction involving a mole of the oxyalkylating agent, i. e., the compound having two oxirane rings and an amine condensate. Proceeding with the example previously described it is obvious the reaction ratio of two moles of the amine condensate to one mole of the oxyalkylating agent gives a product which may be indicated as follows:

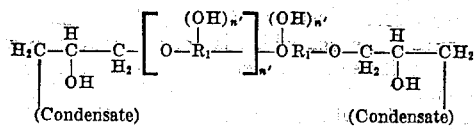

in which $n'$ is a small whole number less than 10, and usually less than 4, and including 0, and $R_1$ represents a divalent radical as previously described being free from any radical having more than 4 uninterrupted carbon atoms in a single chain, and the characterization "condensate" is simply an abbreviation for the condensate which is described in greater detail subsequently.

Such final product in turn also must be soluble but solubility is not limited to an organic solvent but may include water, or for that matter, a solution of water containing an acid such as hydrochloric acid, acetic acid, hydroxyacetic acid, gluconic acid, etc. In other words, the nitrogen groups present, whether two or more, may or may not be signifiantly basic and it is immaterial whether aqueous solubility represents an anhydro base or the free base (combination with water) or a salt form such as the acetate, chloride, etc. The purpose in this instance is to differentiate from insoluble resinous materials, particularly those resulting from gelation or cross-linking. Not only does this property serve to differentiate from instances where an insoluble material is desired but also serves to emphasize the fact that in many instances the preferred compounds have distinct water-solubility or are distinctly dispersible in 5% gluconic acid. For instance, the products freed from any solvent can be shaken with 5 to 20 times their weight of 5% gluconic acid at ordinary temperature and show at least some tendency towards being self-dispersing. The solvent which is generally tried is xylene. If xylene alone does not serve then a mixture of xylene and methanol, for instance, 80 parts of xylene and 20 parts of methanol, or 70 parts of xylene and 30 parts of methanol, can be used. Sometimes it is desirable to add a small amount of acetone to the xylene-methanol mixture, for instance, 5% to 10% of acetone.

The polyepoxide-treated condensates obtained in the manner described are, in turn, oxyalkylation-susceptible and valuable derivatives can be obtained by further reaction with ethylene oxide, propylene oxide, ethylene imine, etc.

Similarly, the polyepoxide-derived compounds can be reacted with a product having both a nitrogen group and a 1,2-epoxy group, such as 3-dialkylaminoepoxypropane. See U. S. Patent No. 2,520,093, dated August 22, 1950, to Gross.

Although the herein described products have a number of industrial applications, they are of particular value for resolving petroleum emulsions of the water-in-oil type that are commonly referred to as "cut oil," "roily oil," "emulsified oil," etc., and which comprise fine droplets of naturally-occurring waters or brines dispersed in a more or less permanent state throughout the oil which constitutes the continuous phase of the emulsion.

The new products are useful as wetting, detergent and leveling agents in the laundry, textile and dyeing industries; as wetting agents and detergents in the acid washing of building stone and brick; as wetting agents and spreaders in the application of asphalt in road building and the like; as a flotation reagent in the flotation separation of various aqueous suspensions containing negatively charged particles, such as sewage, coal washing waste water, and various trade wastes and the like; as germicides, insecticides; emulsifying agents, as, for example, for cosmetics, spray oils, water-repellent textile finishes; as lubricants, etc.

As far as the use of the herein described products goes for purpose of resolution of petroleum emulsions of the water-in-oil type, we particularly prefer to use those which as such or in the form of the free base or hydrate, i. e., combination with water or particularly in the form of a low molal organic acid salt such as the gluconates or the acetate or hydroxyacetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

In the present instance the various condensation products as such or in the form of the free base or in the form of the acetate, may not necessarily be xylene-soluble although they are in many instances. If such compounds are not xylene-soluble the obvious chemical equivalent or equivalent chemical test can be made by simply using some suitable solvent, preferably a water-soluble solvent such as ethylene-glycol diethylether, or a low molol alcohol, or a mixture to dissolve the appropriate product being examined and then mix with the equal weight of xylene, followed by addition of water. Such test is obviously the same for the reason that there will be two phases on vigorous shaking and surface activity makes its presence manifest. It is understood the reference in the hereto appended claims as to the use of xylene in the emulsification test includes such obvious variant.

For purpose of convenience what is said hereinafter will be divided into seven parts:

Part 1 is concerned with the hydrophile nonaryl polyepoxides and particularly diepoxides employed as reactants;

Part 2 is concerned with the phenol-aldehyde resin which is subjected to modification by condensation to yield the amine-modified resin;

Part 3 is concerned with appropriate basic cyclic amidines which may be employed in the preparation of the herein described amine-modified resins;

Part 4 is concerned with reactions involving the resin, the amine, and formaldehyde to produce specific products or compounds which are then subjected to reaction with polyepoxides, and particularly diepoxides;

Part 5 is concerned with reactions involving the two preceding types of materials and examples obtained by such reaction. Generally speaking, this involves nothing more than reaction between 2 moles of a previously prepared amine-modified phenol-aldehyde resin condensate as described and one mole of a hydrophile polyepoxide so as to yield a new and larger resin molecule, or comparable product;

Part 6 is concerned with the resolution of petroleum emulsions of the water-in-oil type by means of the previously described chemical compounds or reaction products; and Part 7 is concerned with uses for the products herein described, either as such or after modification, including any applications other than those involving resolution of petroleum emulsions of the water-in-oil type.

PART 1

Reference is made to previous patents as illustrated in the manufacture of the nonaryl polyepoxides and particularly diepoxides employed as reactants in the instant invention. The simplest diepoxide is probably the one derived from 1,3-butadiene or isoprene. Such derivatives are obtained by the use of peroxides or by other suitable means and the diglycidyl ethers may be indicated thus:

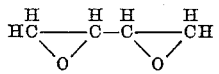

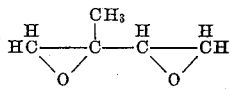

In some instances the compounds are essentially derivatives of etherized epichlorohydrin or methyl epichlorohydrin. Needless to say, such compounds can be derived from glyceral monochlorohydrin by etherization prior to ring closure. An example is illustrated in the previously mentioned Italian Patent No. 400,973:

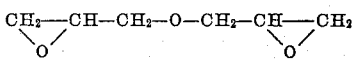

Another type of diepoxide is diisobutenyl dioxide as described in aforementioned U. S. Patent No. 2,070,990, dated February 16, 1937, to Groll, and is of the following formula:

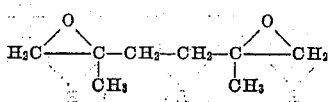

The diepoxides previously described may be indicated by the following formula:

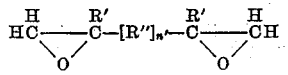

in which $R'$ represents a hydrogen atom or methyl radical and $R''$ represents the divalent radical uniting the two terminal epoxide groups, and $n'$ is the numeral 0 or 1. As previously pointed out, in the case of the butadiene derivative, $n'$ is 0. In the case of diisobutenyl dioxide $R''$ is $CH_2$—$CH_2$ and $n'$ is 1. In another example previously referred to $R''$ is $CH_2OCH_2$ and $n'$ is 1.

However, for practical purposes the only diepoxide available in quantities other than laboratory quantities is a derivative of glycerol or epichlorohydrin. This particular diepoxide is obtained from diglycerol which is largely acyclic diglycerol, and epichlorohydrin or equivalent thereof in that the epichlorohydrin itself may supply the glycerol or diglycerol radical in addition to the epoxy rings. As has been suggested previously, instead of starting with glycerol or a glycerol derivative, one could start with any one of a number of glycols or polyglycols and it is more convenient to include as part of the terminal oxirane ring radical the oxygen atom that was derived from epichlorohydrin or, as might be the case, methyl epichlorohydrin. So presented the formula becomes:

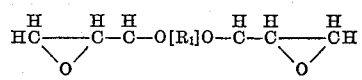

In the above formula $R_1$ is selected from groups such as the following:

$C_2H_4$
$C_2H_4OC_2H_4$
$C_2H_4OC_2H_4OC_2H_4$
$C_3H_6$
$C_3H_6OC_3H_6$
$C_3H_6OC_3H_6OC_3H_6$
$C_4H_8$
$C_4H_8OC_4H_8$
$C_4H_8OC_4H_8OC_4H_8$
$C_3H_5(OH)$
$C_3H_5(OH)OC_3H_5(OH)$
$C_3H_5(OH)OC_3H_5(OH)OC_3H_5(OH)$

It is to be noted that in the above epoxides there is a complete absence of (a) aryl radicals and (b) radical in which 5 or more carbon atoms are united in a single uninterrupted single group. $R_1$ is inherently hydrophile in character as indicated by the fact that it is specified that the precursory diol or polyol OHROH must be water-soluble in substantially all proportions, i. e., water miscible.

Stated another way, what is said previously means that a polyepoxide such as

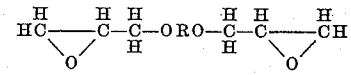

is derived actually or theoretically, or at least derivable, from the diol HOROH, in which the oxygen-linked hydrogen atoms were replaced by

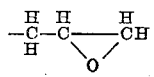

Thus, $R(OH)_n$, where $n$ represents a small whole number which is 2 or more, must be water-soluble. Such limitation excludes polyepoxides if actually derived or theoretically derived at least, from water-insoluble diols or water-insoluble triols or higher polyols. Suitable polyols may contain as many as 12 to 20 carbon atoms or thereabouts.

Referring to a compound of the type above in the formula

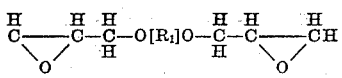

in which $R_1$ is $C_3H_5(OH)$ it is obvious that reaction with another mole of epichlorohydrin with appropriate ring closure would produce a triepoxide or, similarly, if R happened to be $C_3H_5(OH)OC_3H_5(OH)$, one could obtain a tetraepoxide. Actually, such procedure generally yields triepoxides, or mixtures with higher epoxides and perhaps in other instances mixtures in which diepoxides are also present. Our preference is to use the diepoxides.

There is available commercially at least one diglycidyl ether free from aryl groups and also free from any radical having 5 or more carbon atoms in an uninterrupted chain. This particular diglycidyl ether is obtained by the use of epichlorohydrin in such a manner that approximately 4 moles of epichlorohydrin yield one mole of the diglycidyl ether, or, stated another way, it can be considered as being formed from one mole of diglycerol and 2 moles of epichlorohydrin so as to give the appropriate diepoxide. The molecular weight is approximately 370 and the number of epoxide groups per molecule are approximately 2. For this reason in the first of a series of subsequent examples this particular diglycidyl ether is used, although obviously any of the others previously described would be just as suitable. For convenience, this diepoxide will be referred to as diglycidyl ether A. Such material corresponds in a general way to the previous formula.

Using laboratory procedure we have reacted diethyleneglycol with epichlorohydrin and subsequently with alkali so as to produce a product which, on examination, corresponded approximately to the following compound:

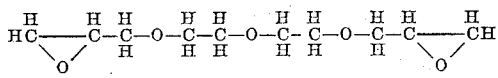

The molecular weight of the product was assumed to be 230 and the product was available in laboratory quantities only. For this reason, the subsequent table referring to the use of this particular diepoxide, which will be referred to as diglycidyl ether B, is in grams instead of pounds.

Probably the simplest terminology for these polyepoxides, and particularly diepoxides, to differentiate from comparable aryl compounds is to use the terminology "epoxyalkanes" and more particularly, polyepoxyalkanes or diepoxyalkanes. The difficulty is that the majority of these compounds represent types in which a carbon atom chain is interrupted by an oxygen atom and, thus, they are not strictly alkane derivatives. Furthermore, they may be hydroxylated or represent a heterocyclic ring. The principal class properly may be referred to as polyepoxypolyglycerols, or diepoxypolyglycerols.

Other examples of diepoxides involving a heterocyclic ring having, for example, 3 carbon atoms and 2 oxygen atoms are, obtainable by the conventional reaction of combining erythritol with a carbonyl compound such as formaldehyde or acetone, so as to form the 5-membered ring, followed by conversion of the terminal hydroxyl groups into epoxy radicals.

PART 2

It is well known that one can readily purchase on the open market, or prepare, fusible, organic solvent-soluble, water-insoluble resin polymers of a composition approximated in an idealized form by the formula

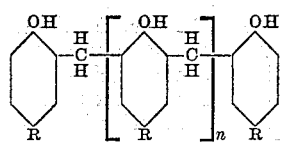

In the above formula $n$ represents a small whole number varying from 1 to 6, 7, or 8, or more, up to probably 10 or 12 units, particularly when the resin is subjected to heating under a vacuum as described in the literature. A limited sub-genus is in the instance of low molecular weight polymers where the total number of phenol nuclei varies from 3 to 6, i. e., $n$ varies from 1 to 4; R represents an aliphatic hydrocarbon substitutent, generally an alkyl radical having from 4 to 15 carbon atoms, such as butyl, amyl, hexyl, decyl or dodecyl radical. Where the divalent bridge radical is shown as being derived from formaldehyde it may, of course, be derived from any other reactive aldehyde having 8 carbon atoms or less.

Because a resin is organic solvent-soluble does not mean it is necessarily soluble in any organic solvent. This is particularly true where the resins are derived from trifunctional phenols as previously noted. However, even when obtained from a difunctional phenol, for instance paraphenylphenol, one may obtain a resin which is not soluble in a nonoxygenated solvent, such as benzene, or xylene, but requires an oxygenated solvent such as a low molal alcohol, dioxane, or diethyleneglycol diethylether. Sometimes a mixture of the two solvents (oxygenated and nonoxygenated) will serve. See Example 9a of U. S. Patent No. 2,499,365, dated March 7, 1950, to De Groote and Keiser.

The resins herein employed as raw materials must be soluble in a nonoxygenated solvent, such as benzene or xylene. This presents no problem insofar that all that is required is to make a solubility test on commercially available resins, or else prepare resins which are xylene or benzene-soluble as described in aforementioned U. S. Patent No. 2,499,365, or in U. S. Patent No. 2,499,368, dated March 7, 1950, to De Groote and Keiser. In said patent there are described oxyalkylation-susceptible, fusible, nonoxygenated organic solvent-soluble, water-insoluble, lowstage phenol-aldehyde resins having an average molecular weight corresponding to at least 3 and not over 6 phenolic nuclei per resin molecule. These resins are difunctional only in regard to methylol-forming reactivity, are derived by reaction between a difunctional monohydric phenol and an aldehyde having not over 8 carbon atoms and reactive toward said phenol and are formed in the substantial absence of trifunctional phenols. The phenol is of the formula

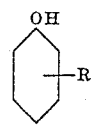

in which R is an aliphatic hydrocarbon radical having at least 4 carbon atoms and not more than 24 carbon atoms, and substituted in the 2, 4, 6 position.

If one selected a resin of the kind just described previously and reacted approximately one mole of the resin with two moles of formaldehyde and two moles of a basic nonhydroxylated secondary amine as specified, following the same idealized over-simplification previously referred to, the resultant product might be illustrated thus:

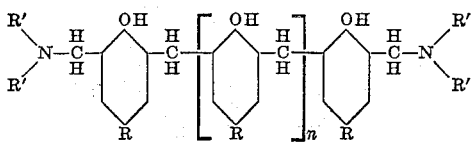

The basic nonhydroxylated amine may be designated thus:

In conducting reactions of this kind one does not necessarily obtain a hundred per cent yield for obvious reasons. Certain side reactions may take place. For instance, 2 moles of amine may combine with one mole of the aldehyde, or only one mole of the amine may combine with the resin molecule, or even to a very slight extent, if at all, 2 resin units may combine without any amine in the reaction product, as indicated in the following formulas:

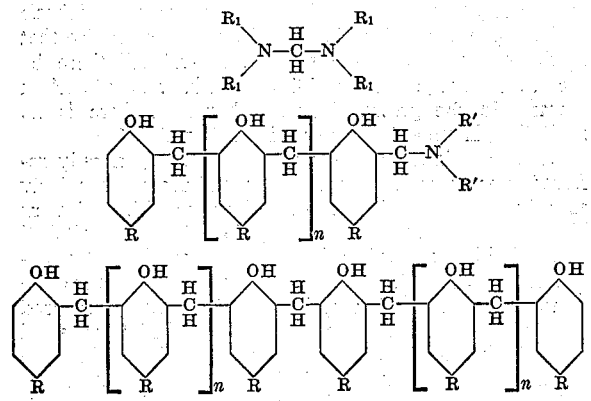

As has been pointed out previously, as far as the resin unit goes one can use a mole of aldehyde other than formaldehyde, such as acetaldehyde, propionaldehyde or butyraldehyde. The resin unit may be exemplified thus:

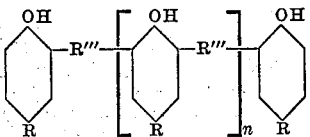

in which R''' is the divalent radical obtained from the particular aldehyde employed to form the resin. For reasons which are obvious the condensation product obtained appears to be described best in terms of the method of manufacture.

Resins can be made using an acid catalyst or basic catalyst or a catalyst having neither acid nor basic properties in the ordinary sense or without any catalyst at all. It is preferable that the resins employed be substantially neutral. In other words, if prepared by using a strong acid as a catalyst, such strong acid should be neutralized. Similarly, if a strong base is used as a catalyst it is preferable that the base be neutralized although we have found that sometimes the reaction described proceeded more rapidly in the presence of a small amount of a free base. The amount may be as small as a 200th of a percent and as much as a few 10ths of a percent. Sometimes moderate increase in caustic soda and caustic potash may be used. However, the most desirable procedure in practically every case is to have the resin neutral.

In preparing resins one does not get a single polymer, i. e., one having just 3 units, or just 4 units, or just 5 units, or just 6 units, etc. It is usually a mixture; for instance, one approximating 4 phenolic nuclei will have some trimer and pentamer present. Thus, the molecular weight may be such that it corresponds to a fractional value for $n$ as, for example, 3.5, 4.5 or 5.2.

In the actual manufacture of the resins we found no reason for using other than those which are lowest in price and most readily available commercially. For purposes of convenience suitable resins are characterized in the following table:

Table I

| Example number | R | Position of R | R''' derived from— | $n$ | Mol. wt. of resin molecule (based on $n+2$) |
|---|---|---|---|---|---|
| 1a | Tertiary butyl | Para | Formaldehyde | 3.5 | 882.5 |
| 2a | Secondary butyl | Ortho | do | 3.5 | 882.5 |
| 3a | Tertiary amyl | Para | do | 3.5 | 959.5 |
| 4a | Mixed secondary and tertiary amyl | Ortho | do | 3.5 | 805.5 |
| 5a | Propyl | Para | do | 3.5 | 805.5 |
| 6a | Tertiary hexyl | do | do | 3.5 | 1,036.5 |
| 7a | Octyl | do | do | 3.5 | 1,190.5 |
| 8a | Nonyl | do | do | 3.5 | 1,267.5 |
| 9a | Decyl | do | do | 3.5 | 1,344.5 |
| 10a | Dodecyl | do | do | 3.5 | 1,498.5 |
| 11a | Tertiary butyl | do | Acetaldehyde | 3.5 | 945.5 |
| 12a | Tertiary amyl | do | do | 3.5 | 1,022.5 |
| 13a | Nonyl | do | do | 3.5 | 1,330.5 |
| 14a | Tertiary butyl | do | Butyraldehyde | 3.5 | 1,071.5 |
| 15a | Tertiary amyl | do | do | 3.5 | 1,148.5 |
| 16a | Nonyl | do | do | 3.5 | 1,456.5 |
| 17a | Tertiary butyl | do | Propionaldehyde | 3.5 | 1,008.5 |
| 18a | Tertiary amyl | do | do | 3.5 | 1,085.5 |
| 19a | Nonyl | do | do | 3.5 | 1,393.5 |
| 20a | Tertiary butyl | do | Formaldehyde | 4.2 | 996.6 |
| 21a | Tertiary amyl | do | do | 4.2 | 1,083.4 |
| 22a | Nonyl | do | do | 4.2 | 1,430.6 |
| 23a | Tertiary butyl | do | do | 4.8 | 1,094.4 |
| 24a | Tertiary amyl | do | do | 4.8 | 1,189.6 |
| 25a | Nonyl | do | do | 4.8 | 1,570.4 |
| 26a | Tertiary amyl | do | do | 1.5 | 604.0 |
| 27a | Hexyl | do | do | 1.5 | 653.0 |
| 28a | do | do | Acetaldehyde | 1.5 | 688.0 |
| 29a | Octyl | do | do | 1.5 | 786.0 |
| 30a | Nonyl | do | do | 1.5 | 835.0 |
| 31a | Octyl | do | Butyraldehyde | 2.0 | 986.0 |
| 32a | Nonyl | do | do | 2.0 | 1,028.0 |
| 33a | Amyl | do | do | 2.0 | 860.0 |
| 34a | Butyl | do | Formaldehyde | 2.0 | 636.0 |
| 35a | Amyl | do | do | 2.0 | 692.0 |
| 36a | Hexyl | do | do | 2.0 | 748.0 |

PART 3

The expression "cyclic amidines" is employed in its usual sense to indicate ring compounds in which there are present either 5 members or 6 members, and having 2 nitrogen atoms separated by a single carbon atom supplemented by either two additional carbon atoms or three additional carbon atoms completing the ring. All the carbon atoms may be substituted. The nitrogen atom of the ring involving two monovalent linkages may be substituted. Needless to say, these compounds include members in which the substituents also may have one or more nitrogen atoms, either in the form of amino nitrogen atoms or in the form of acylated nitrogen atoms.

These cyclic amidines are sometimes characterized as being substituted imidazolines and tetrahydropyrimidines in which the two-position carbon of the ring is generally bonded to a hydrocarbon radical or comparable radical derived from an acid, such as a low molal fatty acid, a high molal fatty acid, or comparable acids such as polycarboxy acids.

Cyclic amidines obtained from oxidized wax acids are described in detail in co-pending Blair application, Serial No. 274,075, filed February 28, 1952. Instead of being derived from oxidized wax acids, the cyclic compounds herein employed may be obtained from any acid from acetic acid upward, and may be obtained from acids, such as benzoic, or acids in which there is a reoccurring ether linkage in the acyl radical. In essence then, with this difference said aforementioned co-pending Blair application, Serial No. 274,075, describes compounds of the following structure:

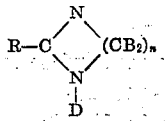

where R is a member of the class consisting of hydrocarbon radicals having up to approximately 30 carbon atoms and includes hydroxylated hydrocarbon radicals and also hydrocarbon radicals in which the carbon atom chain is interrupted by oxygen; n is the numeral 2 to 3, D is a member of the class consisting of hydrogen and organic radicals containing less than 25 carbon atoms, composed of the elements from the group consisting of C, N, O and H, and B is a member of the group consisting of hydrogen and hydrocarbon radicals containing less than 7 carbon atoms, with the proviso that at least three occurrences of B are hydrogen.

The preparation of an imidazoline substituted in the two-position by lower aliphatic hydrocarbon radicals is described in the literature and is readily carried out by reaction between a monocarboxylic acid or ester or amide and a diamine or polyamine, containing at least one primary amino group, and at least one secondary amino group or a second primary amino group separated from the first primary amino group by two carbon atoms.

Examples of suitable polyamines which can be employed as reactants to form basic nitrogen-containing compounds of the present invention include polyalkylene polyamines such as ethylene-diamine, diethylenetriamine, triethylenetetramine, tetraethylenepentamine, and higher polyethylene polyamines, and also including 1,2-diaminopropane, N-ethylethylenediamine, N,N-dibutyldiethylenetriamine, 1,2-diaminobutane, hydroxyethylethylenediamine, 1,2-propylenetriamine, and the like.

For details of the preparation of imidazolines substituted in the 2-position from amines of this type, see the following U. S. Patents: U. S. No. 1,999,989, dated April 30, 1935, Max Bockmuhl et al.; U. S. No. 2,155,877, dated April 25, 1939, Edmund Waldmann et al.; and U. S. No. 2,155,878, dated April 25, 1939, Edmund Waldmann et al. Also see Chem. Rev., 32, 47 (43).

Equally suitable for use in preparing compounds of our invention and for the preparation of tetrahydropyrimidines substituted in the 2-position are the polyamines containing at least one primary amino group and at least one secondary amino group, or another primary amino group separated from the first primary amino group by three carbon atoms. This reaction is generally carried out by heating the reactants to a temperature of 230° C., or higher, usually within the range of 250° C. to 300° C., at which temperatures water is evolved and ring closure is effected. For details of the preparation of tetrahydropyrimidines, see German Patent No. 700,371, dated December 18, 1940, to Edmund Waldmann and August Chwala; German Patent No. 701,322, dated January 14, 1941, to Karl Miescher, Ernst Erech and Willi Klarer; and U. S. Patent No. 2,194,419, dated March 19, 1940, to August Chwala.

Examples of amines suitable for this synthesis include 1,3-propylenediamine, trimethylenediamine, 1,3-diaminobutane, 2,4-diaminopentane, N-ethyl-trimethylenediamine, N-aminoethyl-trimethylene diamine, aminopropyl stearylamine, tripropylenetetramine, tetrapropylenepentamine, high boiling polyamines prepared by the condensation of 1,2-propylene dichloride with ammonia, and similar diamines or polyamines in which there occurs at least one primary amino group separated from another primary or secondary amino group by three carbon atoms.

Thus, broadly speaking, the present invention is concerned with a condensation reaction, in which one class of reactants are substituted ring compounds

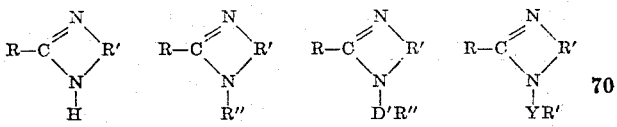

in which R' is a divalent alkylene radical of the class of

—CH₂CH₂—
—CH₂CH₂CH₂—

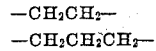

$$-\overset{H}{\underset{CH_3}{C}}-CH_2-$$

$$-CH_2-\overset{CH_3}{\underset{}{CH}}-CH_2-$$

and in which D' represents a divalent, non-amino, organic radical containing less than 25 carbon atoms, composed of elements including C, H, O, and n'Y represents a divalent, organic radical containing less than 25 carbon atoms, composed of elements including C, H, O, and N, and containing at least one amino group, and R includes hydrogen, aliphatic hydrocarbon radicals, hydroxylated aliphatic hydrocarbon radicals, cycloaliphatic hydrocarbon radicals, and hydroxylated cycloaliphatic hydrocarbon radicals; R'' includes hydrogen, aliphatic radicals and cycloaliphatic radicals, with the proviso that in the occurrence of the radicals R and R'' there be present at least one group of 8 to 32 uninterrupted carbon atoms. In the present instance, however, there is no limitation in regard to the radicals R and R''.

As to the six-membered ring compounds generally referred to as substituted pyrimidines, and more particularly as substituted tetra-hydropyrimidines, see U. S. Patent No. 2,534,828, dated December 19, 1950, to Mitchell et al. With the modification as far as the instant application goes, the hydrocarbon group R may have the same variation as when it is part of the five-membered ring previously referred to and is not limited to an alkyl group having at least 10 carbon atoms as in the instance of the aforementioned U. S. Patent No. 2,534,828.

For the purpose of the present invention there is selected from the broad case of compounds previously described such members as meet the following limitations: (a) Have present at least one basic secondary amino radical; and (b) be free from primary amino groups and especially basic primary amino groups. Such compounds may have two-ring membered radicals present instead of one ring-membered radical and may or may not have present a tertiary amine radical or a hydroxyl radical, such as a hydroxy alkyl radical. A large number of compounds have been described in the literature meeting the above specifications, of which quite a few appear in the aforementioned issued U. S. patents. Examples selected from the patents include the following:

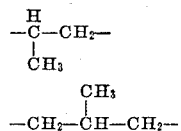

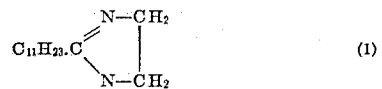

2-undecylimidazoline

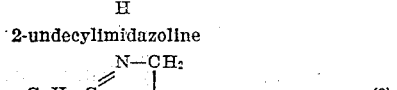

2-heptadecylimidazolines

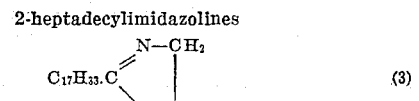

2-oleylimidazoline

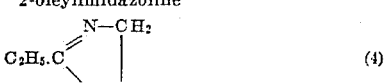

1-N-decylaminoethyl,2-ethylimidazoline

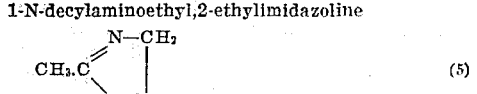

2-methyl,1-hexadecylaminoethylaminoethylimidazoline

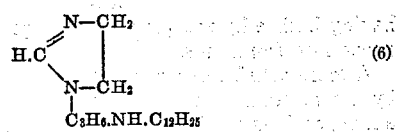

1-dodecylaminopropylimidazoline

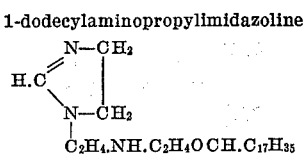

1-stearoyloxyethyl)aminoethylimidazoline

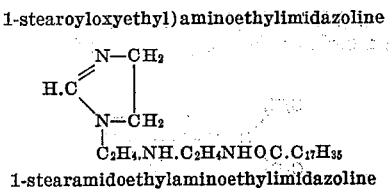

1-stearamidoethylaminoethylimidazoline

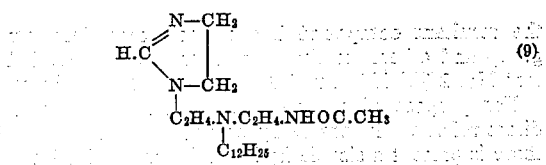

1-(N-dodecyl)-acetamidoethylaminoethylimidazoline

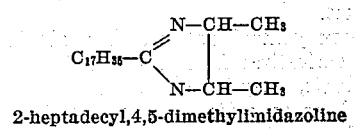

2-heptadecyl,4,5-dimethylimidazoline

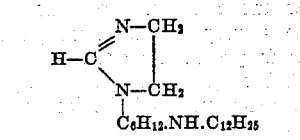

1-dodecylaminohexylimidazoline

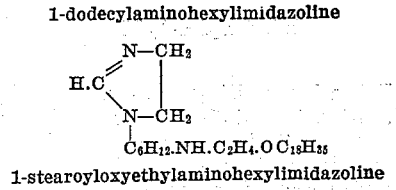

1-stearoyloxyethylaminohexylimidazoline

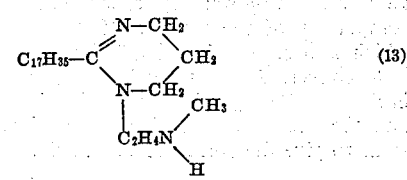

2-heptadecyl,1-methylaminoethyltetrahydropyrimidine

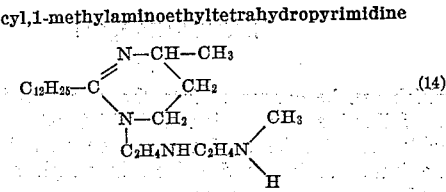

4-methyl,2-dodecyl,1-methylaminoethylaminoethyltetrahydropyrimidine

As has been pointed out previously, the reactants herein employed may have two substituted imidazoline rings or two substituted tetrahydropyrimidine rings. Such compounds are illustrated by the following formula:

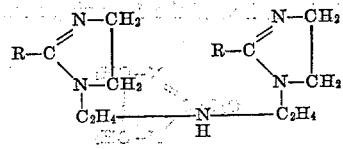

Such compounds can be derived, of course, from tri- ethylenetetramine, tetraethylenepentamine, pentaethylenehexamine, and higher homologues. The substituents may vary depending on the source of the hydrocarbon radical, such as the lower fatty acids and higher fatty acids, a resin acid, naphthenic acid, or the like. The group introduced may or may not contain a hydroxyl radical as in the case of hydroxyacetic acid, acetic acid, ricinoleic acid, oleic acid, etc.

One advantage of a two-ring compound resides in the fact that primary amino groups which constitute the terminal radicals of the parent polyamine, whether a polyethylene amine or polypropylene amine, are converted so as to eliminate the presence of such primary amino radicals. Thus, the two-membered ring compound meets the previous specification in regard to the nitrogen-containing radicals.

Another procedure to form a two-membered ring compound is to use a dibasic acid. Suitable compounds are described, for example, in aforementioned U. S. Patent No. 2,194,419, dated March 19, 1940, to Chwala.

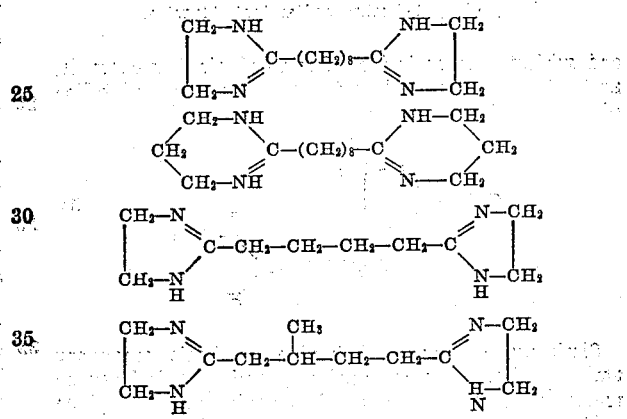

As to compounds having a tertiary amine radical, it is obvious that one can employ derivatives of polyamines in which the terminal groups are unsymmetrically alkylated. Initial polyamines of this type are illustrated by the following formula:

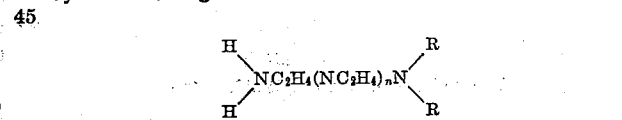

in which R represents a small alkyl radical such as methyl, ethyl, propyl, etc., and n represents a small whole number greater than unity such as 2, 3 or 4. Substituted imidazolines can only be formed from that part of the polyamine which has a primary amino group present. There is no objection to the presence of a tertiary amino radical as previously pointed out. Such derivatives, provided there is more than one secondary amino radical present in the ring compound, may be reacted with an alkylene oxide, such as ethylene oxide, propylene oxide, glycide, etc., so as to convert one or more amino nitrogen radicals into the corresponding hydroxyl alkyl radical, provided, however, that there is still a residue secondary amine group. For instance, in the preceding formula if n represents 4 it means the ring compound would have two secondary nitrogen radicals and could be treated with a single mole of an alkylene oxide and still provide a satisfactory reactant for the herein described condensation reaction.

Ring compounds, such as substituted imidazolines, may be reacted with a substantial amount of alkylene oxide as noted in the preceding paragraph and then a secondary amino group introduced by two steps; first, reaction with an ethylene imine, and second, reaction with another mole of the oxide, or with an alkylating agent such as dimethyl sulfate, benzyl chloride, a low molal ester of a sulfonic acid, an alkyl bromide, etc.

As to oxyalkylated imidazolines and a variety of suitable high molecular weight carboxy acids which may be the source of a substituent radical, see U. S. Patent No. 2,468,180, dated April 26, 1949, to De Groote and Keiser.

Other suitable means may be employed to eliminate a terminal primary amino radical. If there is additionally a basic secondary amino radical present then the primary amino radical can be subjected to acylation notwithstanding the fact that the surviving amino group has no significant basicity. As a rule acylation takes place at the terminal primary amino group rather than at the secondary amino group, thus one can employ a compound such as

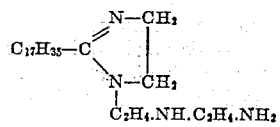

2-heptadecyl,1-diethylenediaminoimidazoline and subject it to acylation so as to obtain, for example, acetylated 2-heptadecyl, 1-diethylenediaminoimidazoline of the following structure:

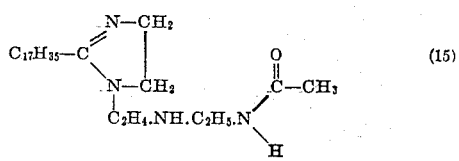

(15)

Similarly, a compound having no basic secondary amino radical but a basic primary amino radical can be reacted with a mole of an alkylene oxide, such as ethylene oxide, propylene oxide, glycide, etc., to yield a perfectly satisfactory reactant for the herein described condensation procedure. This can be illustrated in the following manner by a compound such as

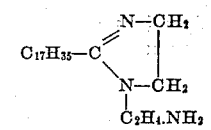

2-heptadecyl,1-aminoethylimidazoline which can be reacted with a single mole of ethylene oxide, for example, to produce the hydroxy ethyl derivative of 2-heptadecyl,1-amino-ethylimidazoline, which can be illustrated by the following formula:

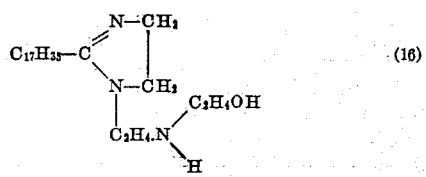

(16)

Other reactants may be employed in connection with an initial reactant of the kind described above, to wit, 2-heptadecyl,1-amino-ethylimidazoline; for instance, reaction with an alkylene imine such as ethylene imine, propylene imine, etc. If reacted with ethylene imine the net result is to convert a primary amino radical into a secondary amino radical and also introduces a new primary amino group. If ethylene imine is employed, the net result is simply to convert 2-heptadecyl,1-aminoethylimidazoline into 2-heptadecyl,1-diethylene-diaminoimidazoline. However, if propylene imine is used the net result is a compound which can be considered as being derived hypothetically from a mixed polyalkylene amine, i. e., one having both ethylene groups and a propylene group between nitrogen atoms.

A more satisfactory reactant is to employ one obtained by the reaction of epichlorohydrin on a secondary alkyl amine, such as the following compound:

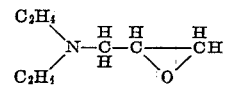

If a mole of 2-heptadecyl,1-aminoethylimidazoline is reacted with a mole of the compound just described, to wit,

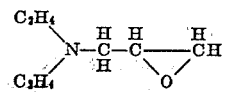

the resultant compound has a basic secondary amino group and a basic tertiary amino group. See U. S. Patent No. 2,520,093, dated August 22, 1950, to Gross.

For purpose of convenience, what has been said by direct reference is largely by way of illustration in which there is present a sizable hydrophobe group, for instance, heptadecyl groups, pentadecyl groups, octyl groups, nonyl groups, etc. etc.

As has been pointed out, one can obtain all these comparable derivatives from low molal acids, such as acetic, propionic, butyric, valeric, etc. Similarly, one can employ hydroxy acids such as glycolic acids, lactic acid, etc. Over and above this, one may employ acids which introduce a very distinct hydrophobe effect as, for example, acids prepared by the oxyethylation of a low molal alcohol, such as methyl, ethyl, propyl, or the like, to produce compounds of the formula $$R(OCH_2CH_2)_nOH$$

in which R is a low molal group, such as methyl, ethyl or propyl, and $n$ is a whole number varying from one up to 15 or 20. Such compounds can be converted into the alkoxide and then reacted with an ester of chloracetic, followed by saponification so as to yield compounds of the type $R(OCH_2CH_2)_nOCH_2COOH$ in which $n$ has its prior significance. Another procedure is to convert the compound into a halide ether such as in $R(OCH_2CH_2)_nCl$ in which $n$ has its prior significance, and then react such halide ether with sodium cyanide so as to give the corresponding nitrile $$R(OCH_3CH_3)_nCN$$

which can be converted into the corresponding acid, of the following composition $R(OCH_2CH_2)_nCOOH$. Such acids can also be used to produce acyl derivatives of the kind previously described in which acetic acid is used as an acylating agent.

What has been said above is intended to emphasize the fact that the nitrogen compounds herein employed can vary from those which are strongly hydrophobe in character and have a minimum hydrophobe property.

Examples of decreased hydrophobe character are exemplified by 2-methylimidazoline, 2-propylimidazoline, and 2-butylimidazoline, of the following structures:

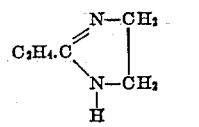

(17)

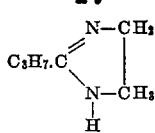
(18)

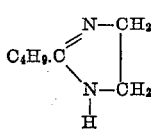
(19)

PART 4

The products obtained by the herein described processes represent cogeneric mixtures which are the result of a condensation reaction or reactions. Since the resin molecule cannot be defined satisfactorily by formula, although it may be so illustrated in an idealized simplification, it is difficult to actually depict the final product of the cogeneric mixture except in terms of the process itself.

Previous reference has been made to the fact that the procedure herein employed is comparable, in a general way, to that which corresponds to somewhat similar derivatives made either from phenols as differentiated from a resin, or in the manufacture of a phenol-amine-aldehyde resin; or else from a particularly selected resin and an amine and formaldehyde in the manner described in Bruson Patent No. 2,031,557, in order to obtain a heat-reactive resin. Since the condensation products obtained are not heat-convertible and since manufacture is not restricted to a single phase system, and since temperatures up to 150° C. or thereabouts may be employed, it is obvious that the procedure becomes comparatively simple. Indeed, perhaps no description is necessary over and above what has been said previously, in light of subsequent examples. However, for purpose of clarity the following details are included.

A convenient piece of equipment for preparation of these cogeneric mixtures is a resin pot of the kind described in aforementioned U. S. Patent No. 2,499,368. In most instances the resin selected is not apt to be a fusible liquid at the early or low temperature stage of reaction if employed as subsequently described; in fact, usually it is apt to be a solid at distinctly higher temperatures, for instance, ordinary room temperature. Thus, we have found it convenient to use a solvent and particularly one which can be removed readily at a comparatively moderate temperature, for instance, at 150° C. A suitable solvent is usually benzene, xylene, or a comparable petroleum hydrocarbon or a mixture of such or similar solvents. Ineed, resins which are not soluble except in oxygenated solvents or mixtures containing such solvents are not here included as raw materials. The reaction can be conducted in such a way that the initial reaction, and perhaps the bulk of the reaction, takes place in a polyphase system. However, if desirable, one can use an oxygenated solvent such as a low-boiling alcohol, including ethyl alcohol, methyl alcohol, etc. Higher alcohols can be used or one can use a comparatively non-volatile solvent such as dioxane or the diethylether of ethyleneglycol. One can also use a mixture of benzene or xylene and such oxygenated solvents. Note that the use of such oxygenated solvent is not required in the sense that it is not necessary to use an initial resin which is soluble only in an oxygenated solvent as just noted, and it is not necessary to have a single phase system for reaction.

Actually, water is apt to be present as a solvent for the reason that in most cases aqueous formaldehyde is employed, which may be the commercial product which is approximately 37%, or it may be diluted down to about 30% formaldehyde. However, para-formaldehyde can be used but it is more difficult perhaps to add a solid material instead of the liquid solution and, everything else being equal, the latter is apt to be more economical. In any event, water is present as water of reaction. If the solvent is completely removed at the end of the process, no problem is involved if the material is used for any subsequent reaction.

In the next succeeding paragraph it is pointed out that frequently it is convenient to eliminate all solvent, using a temperature of not over 150° C. and employing vacuum, if required. This applies, of course, only to those circumstances where it is desirable or necessary to remove the solvent. Petroleum solvents, aromatic solvents, etc., can be used. The selection of solvent, such as benzene, xylene, or the like, depends primarily on cost, i. e., the use of the most economical solvent and also on three other factors, two of which have been previously mentioned; (a) is the solvent to remain in the reaction mass without removal? (b) is the reaction mass to be subjected to further reaction in which the solvent, for instance, an alcohol, either low boiling or high boiling, might interfere as in the case of oxyalkylation; and the third factor is this, (c) is an effort to be made to purify the reaction mass by the usual procedure as, for example, a water-wash to remove the water-soluble unreacted formaldehyde, if any, or a water-wash to remove any unreacted water-soluble polyamine, if employed and present after reaction? Such procedures are well known and, needless to say, certain solvents are more suitable than others. Everything else being equal, we have found xylene the most satisfactory solvent.

We have found no particular advantage in using a low temperature in the early stage of the reaction because, and for reasons explained, this is not necessary although it does apply in some other procedures that, in a general way, bear some similarity to the present procedure. There is no objection, of course, to giving the reaction an opportunity to proceed as far as it will at some low temperature, for instance, 30° to 40° but ultimately one must employ the higher temperature in order to obtain products of the kind herein described. If a lower temperature reaction is used initially the period is not critical, in fact, it may be anything from a few hours up to 24 hours. We have not found any case where it was necessary or even desirable to hold the low temperature stage for more than 24 hours. In fact, we are not convinced there is any advantage in holding it at this stage for more than 3 or 4 hours at the most. This, again, is a matter of convenience largely for one reason. In heating and stirring the reaction mass there is a tendency for formaldehyde to be lost. Thus, if the reaction can be conducted at a lower temperature so as to use up part of the formaldehyde at such lower temperature, then the amount of unreacted formaldehyde is decreased subsequently and makes it easier to prevent any loss. Here, again, this lower temperature is not necessary by virtue of heat convertibility as previously referred to.

If solvents and reactants are selected so the reactants and products of reaction are mutually soluble, then agitation is required only to the extent that it helps cooling or helps distribution of the incoming formaldehyde. This mutual solubility is not necessary as previously pointed out but may be convenient under certain circumstances. On the other hand, if the products are not mutually soluble then agitation should be more vigorous for the reason that reaction probably takes place principally at the interfaces and the more vigorous the agitation the more interfacial area. The general procedure employed is invariably the same when adding the resin and the selected solvent, such as benzene or xylene. Refluxing should be long enough to insure that the resin added, preferably in a powdered form, is completely soluble. However, if the resin is prepared as such it may be added in solution form, just as preparation is described in aforementioned U. S. Patent 2,499,368. After the resin is in complete solution the polyamine is added and stirred. Depending on the polyamine selected, it may or may not be soluble in the resin solution. If it is not soluble in the resin solution it may be soluble in the aqueous formaldehyde solution. If so, the resin then will dissolve in the formaldehyde solution as added, and if not, it is even possible that the initial reaction mass could be a three-phase system instead of a two-phase system although this would be extremely unusual. This solution, or mechanical mixture, if not completely soluble is cooled to at least the reaction temperature or somewhat below, for example 35° C. or slightly lower, provided this initial low temperature stage is employed. The formaldehyde is then added in a suitable form. For reasons pointed out we prefer to use a solution and whether to use a commercial 37% concentration is simply a matter of choice. In large scale manufacturing there may be some advantage in using a 30% solution of formaldehyde but apparently this is not true on a small laboratory scale or pilot plant scale. 30% formaldehyde may tend to decrease any formaldehyde loss or make it easier to control unreacted formaldehyde loss.

On a large scale if there is any difficulty with formaldehyde loss control, one can use a more dilute form of formaldehyde, for instance, a 30% solution. The reaction can be conducted in an autoclave and no attempt made to remove water until the reaction is over. Generally speaking, such a procedure is much less satisfactory for a number of reasons. For example, the reaction does not seem to go to completion, foaming takes place, and other mechanical or chemical difficulties are involved. We have found no advantage in using solid formaldehyde because even here water of reaction is formed.

Returning again to the preferred method of reaction and particularly from the standpoint of laboratory procedure employing a glass resin pot, when the reaction has proceeded as one can reasonably expect at a low temperature, for instance, after holding the reaction mass with or without stirring, depending on whether or not it is homogeneous, at 30° or 40° C. for 4 or 5 hours, or at the most, up to 10–24 hours, we then complete the reaction by raising the temperature up to 150° C., or thereabouts as required. The initial low temperature procedure can be eliminated or reduced to merely the shortest period of time which avoids loss of polyamine or formaldehyde. At a higher temperature we use a phase-separating trap and subject the mixture to reflux condensation until the water of reaction and the water of solution of the formaldehyde is eliminated. We then permit the temperature to rise to somewhere about 100° C., and generally slightly above 100° C., and below 150° C. by eliminating the solvent or part of the solvent so the reaction mass stays within this predetermined range. This period of heating and refluxing, after the water is eliminated, is continued until the reaction mass is homogeneous and then for one to three hours longer. The removal of the solvent is conducted in a conventional manner in the same way as the removal of solvents in resin manufacture as described in aforementioned U. S. Patent No. 2,499,368.

Needless to say, as far as the ratio of reactants goes we have invariably employed approximately one mole of the resin based on the molecular weight of the resin molecule, 2 moles of the secondary polyamine and 2 moles of formaldehyde. In some instances we have added a trace of caustic as an added catalyst but have found no particular advantage in this. In other cases we have used a slight excess of formaldehyde and, again, have not found any particular advantage in this. In other cases we have used a slight excess of nitrogen compound, and, again, have not found any particular advantage in so doing. Whenever feasible we have checked the completeness of reaction in the usual ways, including the amount of water of reaction, molecular weight, and particularly in some instances have checked whether or not the end-product showed surface-activity, particularly in a dilute acetic acid solution. The nitrogen content after removal of unreacted polyamine, if any is present, is another index.

In light of what has been said previously, little more need be said as to the actual procedure employed for the preparation of the herein described condensation products. The following example will serve by way of illustration:

*Example 1b*

The phenol-aldehyde resin is the one that has been identified previously as Example 1a. It was obtained from a para-tertiary butylphenol and formaldehyde. The resin was prepared using an acid catalyst which was completely neutralized at the end of the reaction. The molecular weight of the resin was 882.5. This corresponded to an average of about 3½ phenolic nuclei, as the value for $n$ which excludes the 2 external nuclei, i. e., the resin was largely a mixture having 3 nuclei and 4 nuclei excluding the 2 external nuclei, or 5 and 6 overall nuclei. The resin so obtained in a neutral state had a light amber color.

882 grams of the resin identified as 1a, preceding, were powdered and mixed with a somewhat lesser amount of xylene, i. e., 600 grams. The mixture was refluxed until solution was complete. It was then adjusted to approximately 35° C. and 612 grams of 2-oleylimidazoline, previously shown in a structural formula as ring compound (3), were added. The mixture was stirred vigorously and formaldehyde added slowly. In this particular case the formaldehyde used was a 37% solution and 162 grams were added in approximately 3 hours. The mixture was stirred vigorously and kept within a range of approximately 40° to 44° C., for about 16½ hours. At the end of this time it was refluxed, using a phase-separating trap and a small amount of aqueous distillate withdrawn from time to time. The presence of unreacted formaldehyde was noted. Any unreacted formaldehyde seemed to disappear in approximately three hours after refluxing started. As soon as the odor of formaldehyde was no longer detectable the phase-separating trap was set so as to eliminate all the water of solution and reaction. After the water was eliminated part of the xylene was removed until the temperature reached approximately 148° C. The mass was kept at this higher temperature for 3 or 4 hours. During this time any additional water which was probably water of reaction which had formed, was eliminated by means of the trap. The residual xylene was permitted to stay in the cogeneric mixture. A small amount of the sample was heated on a water bath to remove the excess xylene. The residual material was dark red in color and had the consistency of a thick sticky fluid or tacky resin. The overall reaction time was approximately 30 hours. In other examples it varied from as little as 24 hours up to approximately 38 hours. The time can be reduced by cutting the low temperature period to approximately 3 to 6 hours. Note that in Table II following there are a large number of added examples illustrating the same procedure. In each case the initial mixture was stirred and held at a fairly low temperature (30° to 40° C.) for a period of several hours. Then refluxing was employed until the odor of formaldehyde disappeared. After the odor of formaldehyde disappeared the phase-separating trap was employed to separate out all the water, both the solution and condensation. After all the water had been separated enough xylene was taken out to have the final product reflux for several hours somewhere in the range of 145° to 150° C., or thereabouts. Usually the mixture yielded a clear solution by the time the bulk of the water, or all of the water, had been removed.

Note that as pointed out previously, this procedure is illustrated by 24 examples in Table II.

Table II

| Ex. No. | Resin used | Amt., grs. | Amine used | Amt. of amine, grams | Strength of formaldehyde and amt. | Solvent used and amt. | Reaction temp., °C. | Reaction time (hrs.) | Max. distill. temp., °C. |
|---|---|---|---|---|---|---|---|---|---|
| 1b | 1a | 882 | Amine 3 | 612 | 37% 162 g | Xylene 600 g | 20-25 | 30 | 148 |
| 2b | 3a | 480 | Amine 3 | 306 | 37% 81 g | Xylene 450 g | 21-23 | 24 | 145 |
| 3b | 8a | 633 | Amine 3 | 306 | 37% 81 g | Xylene 600 g | 20-22 | 28 | 150 |
| 4b | 1a | 441 | Amine 4 | 281 | 30% 100 g | Xylene 400 g | 22-24 | 28 | 148 |
| 5b | 3a | 480 | Amine 4 | 281 | 30% 100 g | Xylene 450 g | 21-23 | 30 | 148 |
| 6b | 8a | 633 | Amine 4 | 281 | 37% 81 g | Xylene 600 g | 21-25 | 26 | 146 |
| 7b | 1a | 441 | Amine 5 | 394 | 37% 81 g | Xylene 400 g | 23-28 | 26 | 147 |
| 8b | 3a | 480 | Amine 5 | 394 | 37% 81 g | Xylene 450 g | 22-26 | 26 | 146 |
| 9b | 8a | 633 | Amine 5 | 394 | 37% 81 g | Xylene 600 g | 21-25 | 38 | 150 |
| 10b | 11a | 473 | Amine 13 | 379 | 30% 100 g | Xylene 450 g | 20-24 | 36 | 149 |
| 11b | 12a | 511 | Amine 13 | 379 | 30% 100 g | Xylene 500 g | 21-22 | 24 | 142 |
| 12b | 13a | 665 | Amine 13 | 379 | 30% 100 g | Xylene 650 g | 20-21 | 26 | 145 |
| 13b | 1a | 441 | Amine 16 | 395 | 38% 81 g | Xylene 425 g | 22-28 | 28 | 146 |
| 14b | 3a | 480 | Amine 16 | 395 | 37% 81 g | Xylene 450 g | 23-30 | 27 | 150 |
| 15b | 7a | 595 | Amine 16 | 395 | 37% 81 g | Xylene 550 g | 20-24 | 29 | 147 |
| 16b | 1a | 441 | Amine 17 | 99 | 37% 81 g | Xylene 440 g | 20-21 | 30 | 148 |
| 17b | 3a | 480 | Amine 17 | 99 | 37% 81 g | Xylene 480 g | 21-26 | 32 | 146 |
| 18b | 12a | 511 | Amine 17 | 99 | 37% 81 g | Xylene 600 g | 21-23 | 26 | 147 |
| 19b | 20a | 498 | Amine 18 | 113 | 37% 81 g | Xylene 500 g | 21-32 | 29 | 150 |
| 20b | 21a | 542 | Amine 18 | 113 | 37% 81 g | Xylene 500 g | 21-30 | 32 | 150 |
| 21b | 23a | 547 | Amine 18 | 113 | 37% 81 g | Xylene 550 g | 21-23 | 37 | 150 |
| 22b | 1a | 441 | Amine 19 | 126 | 37% 81 g | Xylene 440 g | 20-23 | 30 | 150 |
| 23b | 24a | 595 | Amine 19 | 126 | 37% 81 g | Xylene 600 g | 20-25 | 36 | 149 |
| 24b | 25a | 391 | Amine 19 | 126 | 30% 50 g | Xylene 400 g | 20-24 | 32 | 152 |

The amine numbers referred to are the ring compounds identified previously by number in Part 3.

PART 5

Cognizance should be taken of one particular feature in connection with the reaction involving the polyepoxide and the amine condensate and that is this; the amine-modified phenol-aldehyde resin condensate is invariably basic and thus one need not add the usual catalysts which are used to promote such reactions. Generally speaking, the reaction will proceed at a satisfactory rate under suitable conditions without any catalyst at all.

Employing polyepoxides in combination with a non-basic reactant the usual catalysts include alkaline materials such as caustic soda, caustic potash, sodium methylate, etc. Other catalysts may be acidic in nature and are of the kind characterized by iron and tin chloride. Furthermore, insoluble catalysts such as clays or specially prepared mineral catalysts have been used. If for any reason the reaction did not proceed rapidly enough with the diglycidyl ether or other analogous reactant, then a small amount of finely divided caustic soda or sodium methylate could be employed as a catalyst. The amount generally employed would be 1% or 2%.

It goes without saying that the reaction can take place in an inert solvent, i. e., one that is not oxyalkylation-susceptible. Generally speaking, this is most conveniently an aromatic solvent such as xylene or a higher boiling coal tar solvent, or else a similar high boiling aromatic solvent obtained from petroleum. One can employ an oxygenated solvent such as the diethylether of ethylene glycol, or the diethylether of propylene glycol, or similar ethers, either alone or in combination with a hydrocarbon solvent. The selection of the solvent depends in part on the subsequent use of the derivatives or reaction products. If the reaction products are to be rendered solvent-free and it is necessary that the solvent be readily removed as, for example, by the use of vacuum distillation, thus xylene or an aromatic petroleum will serve.

Example 1c

The product was obtained by reaction between the diepoxide previously designated as diepoxide A and condensate 2b. Condensate 2b was derived from resin 3a. Resin 3a, in turn, was obtained from tertiary amylphenol and formaldehyde. Condensate 2b employed as reactants resin 3a and diethanolamine. The amount of resin employed was 480 grams; the amount of diethanolamine employed was 105 grams, and the amount of 37% formaldehyde employed was 81 grams. The amount of solvent (xylene) employed was 450 grams. All this has been described previously.

The solution of the condensate in xlyene was adjusted to a 50% solution. In this particular instance, and in practically all the others which appear in the subsequent tables, the examples are characterized by the fact that no alkaline catalyst was added. The reason is, of course, that the condensate as such is strongly basic. If desired, a small amount of an alkaline catalyst could be added, such as finely powdered caustic soda, sodium methylate, etc. If such alkaline catalyst is added it may speed up the reaction, but it may also cause an undesirable reaction, such as the polymerization of the diepoxide.

In any event, 160 grams of the condensate dissolved in an equal weight of xylene were stirred and heated to about 107° C. 18.5 grams of the diepoxide previously identified as diepoxide A, and dissolved in an equal weight of xylene, were added dropwise. The initial addition of the xylene solution carried the temperature to about 107° C. The remainder of the diepoxide was added during approximately an hour's time. During this period of time the reflux temperature rose to about 126° C. The product was allowed to reflux at about 130° C. using a phase-separating trap. A small amount of xylene was removed by means of the phase-separating trap so that the refluxing temperature rose gradually to a maximum of 160° C. The mixture was refluxed at 160° C. for approximately 4½ hours. Experience has indicated that this period of time was sufficient to complete the reaction.

At the end of the period the xylene which had been removed during the reflux period was returned to the mixture. A small amount of material was withdrawn and the xylene evaporated on a hot plate in order to examine the physical properties. The material was a dark red viscous semi-solid. It was insoluble in water, it was insoluble in 5% gluconic acid, and it was soluble in xylene, and particularly in a mixture of 80% xylene and 20% methanol. However, if the material was dissolved in an oxygenated solvent and then shaken with 5% gluconic acid it showed a definite tendency to disperse, suspend, or form a sol, and particularly in a xylene-methanol mixed solvent as previously described, with or without the further addition of a little acetone.

The procedure employed of course is simple in light of what has been said previously and in effect is a procedure similar to that employed in the use of glycide or methylglycide as oxyalkylating agents. See, for example, Part 1 of U. S. Patent No. 2,602,062, dated July 1, 1952, to De Groote.

Various examples obtained in substantially the same manner are enumerated in the following tables:

ing a small amount of initially lower boiling solvent such as benzene, or use benzene entirely. Also, we have found

*Table III*

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1c | 2b | 160 | A | 18.5 | 178.5 | 2:1 | 5 | 160 | Dark resinous mass |
| 2c | 5b | 155 | A | 18.5 | 173.5 | 2:1 | 5 | 162 | Do. |
| 3c | 7b | 169 | A | 18.5 | 187.5 | 2:1 | 5 | 158 | Do. |
| 4c | 8b | 177 | A | 18.5 | 195.5 | 2:1 | 6 | 165 | Do. |
| 5c | 10b | 173 | A | 18.5 | 191.5 | 2:1 | 6 | 170 | Do. |
| 6c | 12b | 211 | A | 18.5 | 229.5 | 2:1 | 6 | 164 | Do. |
| 7c | 13b | 170 | A | 18.5 | 188.5 | 2:1 | 5 | 168 | Do. |
| 8c | 18b | 124 | A | 18.5 | 142.5 | 2:1 | 5 | 158 | Do. |
| 9c | 19b | 125 | A | 18.5 | 143.5 | 2:1 | 5 | 162 | Do. |
| 10c | 20b | 131 | A | 18.5 | 149.5 | 2:1 | 5 | 160 | Do. |

*Table IV*

| Ex. No. | Condensate used | Amt., grs. | Diepoxide used | Amt., grs. | Xylene, grs. | Molar ratio | Time of reaction, hrs. | Max. temp., °C. | Color and physical state |
|---|---|---|---|---|---|---|---|---|---|
| 1d | 2b | 160 | B | 11 | 171 | 2:1 | 6 | 162 | Dark resinous mass |
| 2d | 5b | 155 | B | 11 | 166 | 2:1 | 6 | 165 | Do. |
| 3d | 7b | 169 | B | 11 | 180 | 2:1 | 6 | 168 | Do. |
| 4d | 8b | 177 | B | 11 | 188 | 2:1 | 6 | 160 | Do. |
| 5d | 10b | 173 | B | 11 | 184 | 2:1 | 6 | 165 | Do. |
| 6d | 12b | 211 | B | 11 | 222 | 2:1 | 6 | 168 | Do. |
| 7d | 13b | 170 | B | 11 | 181 | 2:1 | 6 | 158 | Do. |
| 8d | 18b | 124 | B | 11 | 135 | 2:1 | 5 | 160 | Do. |
| 9d | 19b | 125 | B | 11 | 136 | 2:1 | 5 | 162 | Do. |
| 10d | 20b | 131 | B | 11 | 142 | 2:1 | 5 | 165 | Do. |

Solubility in regard to all these compounds was substantially similar to that which was described in Example 1c.

*Table V*

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1c | 2b | 3,570 | 3,570 | 1,285 | 13 |
| 2c | 5b | 3,470 | 3,476 | 1,741 | 13 |
| 3c | 7b | 3,750 | 3,745 | 1,870 | 13 |
| 4c | 8b | 3,910 | 3,910 | 1,955 | 13 |
| 5c | 10b | 3,830 | 3,830 | 1,915 | 13 |
| 6c | 12b | 4,590 | 4,595 | 2,300 | 13 |
| 7c | 13b | 3,770 | 3,770 | 1,885 | 17 |
| 8c | 18b | 2,850 | 2,850 | 1,425 | 13 |
| 9c | 19b | 2,870 | 2,870 | 1,435 | 14 |
| 10c | 20b | 2,990 | 2,995 | 1,500 | 14 |

*Table VI*

| Ex. No. | Resin condensate used | Probable mol. wt. of reaction product | Amt. of product, grs. | Amt. of solvent, grs. | Probable number of hydroxyls per molecule |
|---|---|---|---|---|---|
| 1d | 2b | 3,420 | 3,425 | 1,715 | 11 |
| 2d | 5b | 3,320 | 3,320 | 1,660 | 11 |
| 3d | 7b | 3,600 | 3,600 | 1,800 | 11 |
| 4d | 8b | 3,760 | 3,760 | 1,880 | 11 |
| 5d | 10b | 3,680 | 3,675 | 1,835 | 11 |
| 6d | 12b | 4,440 | 4,440 | 2,220 | 11 |
| 7d | 13b | 3,620 | 3,620 | 1,810 | 15 |
| 8d | 18b | 2,700 | 2,700 | 1,350 | 11 |
| 9d | 19b | 2,720 | 2,720 | 1,360 | 12 |
| 10d | 20b | 2,840 | 2,840 | 1,420 | 12 |

At times we have found a tendency for an insoluble mass to form or at least to obtain incipient cross-linking or gelling even when the molal ratio is in the order of 2 moles of resin to one of diepoxide. We have found this can be avoided by any one of the following procedures or their equivalent. Dilute the resin or the diepoxide, or both, with an inert solvent, such as xylene or the like. In some instances an oxygenated solvent such as the diethyl ether of ethyleneglycol may be employed. Another procedure which is helpful is to reduce the amount of catalyst used, or reduce the temperature of reaction by adding a small amount of initially lower boiling solvent such as benzene, or use benzene entirely. Also, we have found it desirable at times to use slightly less than apparently the theoretical amount of diepoxide, for instance 90% or 95% instead of 100%. The reason for this fact may reside in the possibility that the molecular weight dimensions on either the resin molecule or the diepoxide molecule may actually vary from the true molecular weight by several percent.

Previously the condensate has been depicted in a simplified form which, for convenience, may be shown thus:

(Amine)CH$_2$(Resin)CH$_2$(Amine)

Following such simplification the reaction product with a polyepoxide and particularly a diepoxide, would be indicated thus:

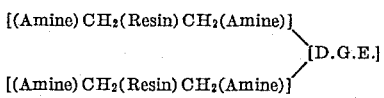

in which D. G. E. represents a diglycidyl ether as specified. If the amine happened to have more than one reactive hydrogen, as in the case of a hydroxylated amine or polyamine, having a multiplicity of secondary amino groups it is obvious that other side reactions could take place as indicated by the following formulas:

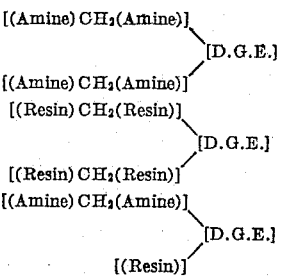

All the above indicates the complexity of the reaction product obtained after treating the amine-modified resin condensate with a polyepoxide and particularly diepoxide as herein described.

PART 6

Conventional demulsifying agents employed in the treatment of oil field emulsions are used as such, or after dilution with any suitable solvent, such as water, petroleum hydrocarbons, such as benzene, toluene, xylene, tar acid oil, cresol, anthracene oil, etc. Alcohols, particularly aliphatic alcohols, such as methyl alcohol, ethyl alcohol, denatured alcohol, propyl alcohol, butyl alcohol, hexyl alcohol, octyl alcohol, etc., may be employed as diluents. Miscellaneous solvents such as pine oil, carbon tetrachloride, sulfur dioxide extract obtained in the refining of petroleum, etc., may be employed as diluents. Similarly, the material or materials employed as the demulsifying agent of our process may be admixed with one or more of the solvents customarily used in connection with conventional demulsifying agents. Moreover, said material or materials may be used alone or in admixture with other suitable well-known classes of demulsifying agents.

It is well known that conventional demulsifying agents may be used in a water-soluble form, or in an oil-soluble form, or in a form exhibiting both oil- and water-solubility. Sometimes they may be used in a form which exhibits relatively limited oil-solubility. However, since such reagents are frequently used in a ratio of 1 to 10,000 or 1 to 20,000, or 1 to 30,000, or even 1 to 40,000, or 1 to 50,000 as in desalting practice, such an apparent insolubility in oil and water is not significant because said reagents undoubtedly have solubility within such concentrations. This same fact is true in regard to the material or materials of our invention when employed as demulsifying agents.

The materials of our invention, when employed as treating or demulsifying agents, are used in the conventional way, well known to the art, described, for example, in Patent 2,626,929, dated January 27, 1953, Part 3, and reference is made thereto for a description of conventional procedures of demulsifying, including batch, continuous, and down-the-hole demulsification, the process essentially involving introducing a small amount of demulsifier into a large amount of emulsion with adequate admixture with or without the application of heat, and allowing the mixture to stratify.

As noted above, the products herein described may be used not only in diluted form, but also may be used admixed with some other chemical demulsifier. A mixture which illustrates such combination is the following:

Oxyalkylated derivative, for example, the product of Example 1c, 20%;
A cyclohexylamine salt of a polypropylated naphthalene monosulfonic acid, 24%;
An ammonium salt of a polypropylated naphthalene monosulfonic acid, 24%;
A sodium salt of oil-soluble mahogany petroleum sulfonic acid, 12%;
A high-boiling aromatic petroleum solvent, 15%;
Isopropyl alcohol, 5%.
The above proportions are all weight percents.

PART 7

The products herein described as such and prepared in accordance with this invention can be used as emulsifying agents, for oils, fats and waxes, as ingredients in insecticide compositions, or as detergents and wetting agents in the laundering, scouring, dyeing, tanning and mordanting industries. They may also be used for preparing boring or metal-cutting oils and cattle dips, as metal pickling inhibitors, and for pharmaceutical purposes.

Other uses include the preparation or resolution of petroleum emulsions, whether of the water-in-oil type or oil-in-water type. They may be used as additives in connection with other emulsifying agents; they may be employed to contribute hydrotropic effects; they may be used as anti-strippers in connection with asphalts; they may be used to prevent corrosion, particularly the corrosion in ferrous metals for various purposes and particularly in connection with the production of oil and gas, and also in refineries where crude oil is converted into various commercial products. The products may be used industrially to inhibit or stop micro-organic growth or other objectionable lower forms of life, such as the growth of algae, or the like; they may be used to inhibit the growth of bacteria, moles, etc.; they are valuable additives to lubricating oils, both those derived from petroleum and synthetic lubricating oils, and also to hydraulic brake fluids of the aqueous or non-aqueous type, some have definite anti-corrosive action. They may be used also in connection with other processes where they are injected into an oil or gas well for purpose of removing a mud sheath, increasing the ultimate flow of fluid from the surrounding strata, and particularly in secondary recovery operations using aqueous flood waters. They can also be used in dry cleaners' soaps.

With regard to the above statements, reference is made particularly to the use of the materials as such, or in the form of a salt; the salt form refers to a salt involving either one or both basic nitrogen atoms. Obviously, the salt form involves a modification in which the hydrophile character can be either increased or decreased and, inversely, the hydrophobe character can be decreased or increased. For example, neutralizing the product with practically any low molal acid, such as acetic acid, hydroxyacetic acid, lactic acid, or nitric acid, is apt to markedly increase the hydrophile effect. One may also use acids of the type

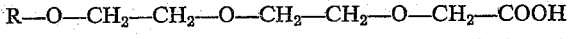

R—O—CH$_2$—CH$_2$—O—CH$_2$—CH$_2$—O—CH$_2$—COOH in which R is a comparatively small alkyl radical, such as methyl, ethyl or propyl. The hydrophile effect may be decreased and the hydrophobe effect increased by neutralization with a monocarboxy detergent-forming acid. These are acids which have at least 8 and not more than 32 carbon atoms. They are obtained from higher fatty acids and include also resin acids such as abietic acid, and petroleum acids such as naphthenic acids and acids obtained by the oxidation of wax. One can also obtain new products having unique properties by combination with polybasic acids, such as diglycolic acid, oxalic acid, dimerized acids from linseed oil, etc. The most common examples, of course, are the higher fatty acids having generally 10 to 18 carbon atoms. We have found that a particularly valuable anti-corrosive agent can be obtained from any suitable resin and formaldehyde provided the secondary amine is dicyclohexylamine. The corrosion-inhibiting properties of this compound can be increased by neutralization with either one or two moles of an oil-soluble sulfonic acid, particularly a sulfonic acid of the type known as mahogany sulfonic acid.

The oil-soluble sulfonic acids previously referred to may be synthetically derived by sulfonating olefins, aliphatic fatty acids, or their esters, alkylated aromatics or their hydroxyl derivatives, partially hydrogenated aromatics, etc., with sulfuric acid or other sulfonating agents. However, the soaps of so-called mahogany acids which are usually produced during treatment of lubricating oil distillates with concentrated sulfuric acid (85% or higher concentration) remain in the oil after settling out sludge. These sulfonic acids may be represented as

$(R)_n$—⟨⟩—SO$_3$H where $(R)_n$ is one or more alkyl, alkaryl or aralkyl groups and the aromatic nucleus may be a single or condensed ring or a partially hydrogenated ring. The lower molecular weight acids can be extracted from the acid treated oil by adding a small amount of water, preferably after dilution of the oil with kerosene. However, the more desirable high molecular weight (350–500) acids, particularly those produced when treating petroleum distillates with fuming acid to produce white oil, are normally recovered as sodium soaps by neutralizing the acid oil with sodium hydroxide or carbonate and extracting with aqueous alcohol. The crude soap extract is first recovered as a watercurd after removal of alcohol by distillation and a gravity separation of some of the contaminating salts (sodium carbonate, sulfates and sulfites). These materials still contain considerable quantities of salts and consequently are normally purified by addition of a more concentrated alcohol followed by storage to permit settling of salt brine. The alcohol and water are then stripped out and the sodium salts so obtained converted into free acids.

Not only can one obtain by-product sulfonic acids of the mahogany type which are perfectly satisfactory and within the molecular range of 300 to 600 but also one can obtain somewhat similar materials which are obtained as the principal product of reaction and have all the usual characteristics of normal by-product sulfonic acids but in some instances contain two sulfonic groups, i. e., are disulfonic acids. This type of mahogany acid, or better still, oil-soluble sulfonic acid, is perfectly satisfactory for the above described purpose.

Much of what has been said previously is concerned with derivatives in which the hydrophile properties are enhanced in comparison with the resin as such. A procedure designed primarily to enhance the hydrophobe properties of the resin involves derivatives obtained by a phenyl or substituted phenyl glycidyl ether of the structure

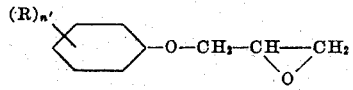

in which R represents a hydrocarbon substituent such as an alkyl radical having 1 to 24 carbon atoms, of a cyclic group, such as a cyclohexyl group, a phenyl group, or a benzyl group, and $n'$ represents 0, 1, 2 or 3. $n'$ is zero in the instance of the unsubstituted phenyl radical. Such compounds are in essence oxyalkylating agents and reaction involves the introduction of a hydrophobe group and the formation of an alkanol hydroxyl radical.

As far as the use of the herein described products goes for purpose of resolution of petroleum emulsions of the water-in-oil type, we particularly prefer to use those which as such or in the form of the free base or hydrate, i. e., combination of water or particularly in the form of a low molal organic acid such as the acetate or hydroxyacetate, have sufficiently hydrophile character to at least meet the test set forth in U. S. Patent No. 2,499,368, dated March 7, 1950, to De Groote et al. In said patent such test for emulsification using a water-insoluble solvent, generally xylene, is described as an index of surface activity.

Having thus described our invention, what we claim as new and desire to secure by Letters Patent, is:

1. The method of first (A) condensing (a) fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

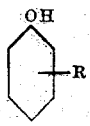

in which R is a saturated aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines wherein the substituent is an organic radical composed of elements selected from the group consisting of carbon, hydrogen, oxygen and nitrogen and in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction with the proviso that the molar ratio of reactants (a), (b) and (c) be approximately 1, 2 and 2 respectively; and with the proviso that the resinous condensation product resulting from the process be heat-stable; followed by (B) reacting said resin condensate with nonaryl hydrophile compounds containing at least two 1,2-epoxy rings obtained by replacement of an oxygen-linked hydrogen atom in a water-soluble polyhydric alcohol by the radical

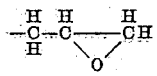

said 1,2-epoxy ring containing compounds being free from reactive functional groups other than 1,2-epoxy rings and hydroxyl groups and characterized by the fact that the divalent linkage uniting the terminal oxirane rings is free from any radical having more than 4 uninterrupted carbon atoms in a single chain; said 1,2-epoxy ring containing compounds being characterized by having present not more than 20 carbon atoms; with the further proviso that said reactive compounds (A) and (B) be members of the class consisting of non-thermosetting solvent-soluble liquids and solids melting below the point of pyrolysis; with the added proviso that the reaction product be a member of the class of solvent-soluble liquids and solids melting below the point of pyrolysis; and said reaction between (A) and (B) being conducted below the pyrolytic point of the reactants and the resultants of reaction; and with the final proviso that the ratio of reactants be 2 moles of the resin condensate to 1 mole of the polyepoxide.

2. The product obtained by the method described in claim 1.

3. The method of first (A) condensing (a) fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

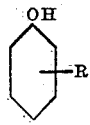

in which R is a saturated aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines wherein the substituent is an organic radical composed of elements selected from the group consisting of carbon, hydrogen, oxygen and nitrogen and in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction with the proviso that the molar ratio of reactants (a), (b) and (c) be approximately 1, 2 and 2 respectively; and with the proviso that the resinous condensation product resulting from the process be heat-stable; followed by (B) reacting said resin condensate with nonaryl hydrophile compounds containing two terminal 1,2-epoxy rings obtained by replacement of an oxygen-linked hydrogen atom in a water-soluble polyhydric alcohol by the radical

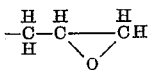

said 1,2-epoxy ring containing compounds being free from reactive functional groups other than 1,2-epoxy rings and hydroxyl groups and characterized by the fact that the divalent linkage uniting the terminal oxirane rings is free from any radical having more than 4 uninterrupted carbon atoms in a single chain; said 1,2-epoxy ring containing compounds being characterized by having present not more than 20 carbon atoms; with the further proviso that said reactive compounds (A) and (B) be members of the class consisting of non-thermosetting solvent-soluble liquids and solids melting below the point of pyrolysis; with the added proviso that the reaction product be a member of the class of solvent-soluble liquids and solids melting below the point of pyrolysis; and said reaction between (A) and (B) being conducted below the pyrolytic point of the reactants and the resultants of reaction; and with the final proviso that the ratio of reactants be 2 moles of the resin condensate to 1 mole of the diepoxide.

4. The process of claim 3 wherein the diepoxide contains at least one reactive hydroxyl radical.

5. The method of first (A) condensing (a) fusible, non-oxygenated organic solvent-soluble, water-insoluble, phenol-aldehyde resin having an average molecular weight corresponding to at least 3 and not over 6 phenolic nuclei per resin molecule; said resin being difunctional only in regard to methylol-forming reactivity; said resin being derived by reaction between a difunctional monohydric phenol and an aldehyde having not over 8 carbon atoms and reactive toward said phenol; said resin being formed in the substantial absence of trifunctional phenols; said phenol being of the formula

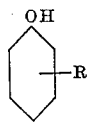

in which R is a saturated aliphatic hydrocarbon radical having at least 4 and not more than 24 carbon atoms and substituted in the 2,4,6 position; (b) cyclic amidines selected from the class consisting of substituted imidazolines and substituted tetrahydropyrimidines wherein the substituent is an organic radical composed of elements selected from the group consisting of carbon, hydrogen, oxygen and nitrogen and in which there is present at least one basic secondary amino radical and characterized by freedom from any primary amino radical; and (c) formaldehyde; said condensation reaction being conducted at a temperature sufficiently high to eliminate water and below the pyrolytic point of the reactants and resultants of reaction with the proviso that the molar ratio of reactants (a), (b) and (c) be approximately 1, 2 and 2 respectively; and with the proviso that the resinous condensation product resulting from the process be heat-stable followed by (B) reacting said resin condensate with a hydroxylated diepoxypolyglycerol containing two terminal 1,2-epoxy rings and having not more than 20 carbon atoms; with the further proviso that said reactive compounds (A) and (B) be members of the class consisting of non-thermosetting solvent-soluble liquids and solids melting below the point of pyrolysis; with the added proviso that the reaction product be a member of the class of solvent-soluble liquids and solids melting below the point of pyrolysis; and said reaction between (A) and (B) being conducted below the pyrolytic point of the reactants and the resultants of reaction; and with the final proviso that the ratio of reactants be 2 moles of the resin condensate to 1 mole of the diepoxide.

6. The method of claim 5 wherein the polyglycerol derivative has not over 5 glycerol nuclei.

7. The method of claim 5 wherein the polyglycerol derivative has not over 5 glycerol nuclei, and the precursory phenol is para-substituted.

8. The method of claim 5 wherein the polyglycerol derivative has not over 5 glycerol nuclei, and the precursory phenol is para-substituted and contains at least 4 and not over 14 carbon atoms in the substituent group.

9. The method of claim 5 wherein the polyglycerol derivative has not over 5 glycerol nuclei, and the precursory phenol is para-substituted and contains at least 4 and not over 14 carbon atoms in the substituent group, and the precursory aldehyde is formaldehyde.

10. The method of claim 5 wherein the polyglycerol derivative has not over 5 glycerol nuclei, and the precursory phenol is para-substituted and contains at least 4 and not over 14 carbon atoms in the substituent group, and the precusory aldehyde is formaldehyde, and the total number of phenolic nuclei in the initial resin are not over 5.

References Cited in the file of this patent

UNITED STATES PATENTS

| | | |
|---|---|---|
| 2,031,557 | Bruson | Feb. 18, 1936 |
| 2,521,912 | Greenlee | Sept. 12, 1950 |
| 2,679,488 | De Groote | May 25, 1954 |